United States Patent [19]

Welsh

[11] 4,395,385

[45] Jul. 26, 1983

[54] PROCESS FOR REMOVING HYDROGEN SULFIDE FROM SOUR GAS STREAMS

[75] Inventor: Charles J. Welsh, Oklahoma City, Okla.

[73] Assignee: Kerr-McGee Refining Corporation, Oklahoma City, Okla.

[21] Appl. No.: 209,836

[22] Filed: Nov. 24, 1980

[51] Int. Cl.³ ............................................. B01D 53/34
[52] U.S. Cl. .................................... 423/234; 423/560; 423/561 A
[58] Field of Search ............... 423/220, 228, 229, 234, 423/561 A, 560

[56] References Cited

U.S. PATENT DOCUMENTS

| 740,700 | 10/1903 | Schutz | 423/234 |
|---|---|---|---|
| 2,662,000 | 12/1953 | Maschwitz | 423/561 A |
| 2,747,962 | 5/1956 | Heitz et al. | 423/234 |
| 3,245,752 | 4/1966 | Fryar et al. | 423/229 |
| 3,839,548 | 10/1974 | Jackson | 423/234 X |
| 4,151,260 | 4/1979 | Woertz | 423/234 X |

FOREIGN PATENT DOCUMENTS 471488 12/1972 Australia .............................. 423/220

OTHER PUBLICATIONS

"Simultaneous Utilization of Waste Sodium Hydroxide and Hydrogen Sulfide Containing Waste Gas", *Kaguko Kojo*, 11, (No. 5), (1967), and English Translation.
X *Thorpe's Dictionary of Applied Chemistry* at 891, (4th ed., 1950).

*Primary Examiner*—Earl C. Thomas
*Attorney, Agent, or Firm*—William G. Addison

[57] ABSTRACT

A process for removing hydrogen sulfide from a sour gas stream wherein the sour gas stream is contacted with an aqueous alkali metal hydroxide solution containing a stoichiometric excess of the alkali metal hydroxide to provide a sweet gas substantially free of hydrogen sulfide and a partially spent aqueous alkali metal solution. The partially spent aqueous alkali metal solution is contacted with a second sour gas stream in a countercurrent absorber to provide a second sweet gas and a substantially caustic-free aqueous solution of the alkali metal hydrosulfide.

18 Claims, 1 Drawing Figure

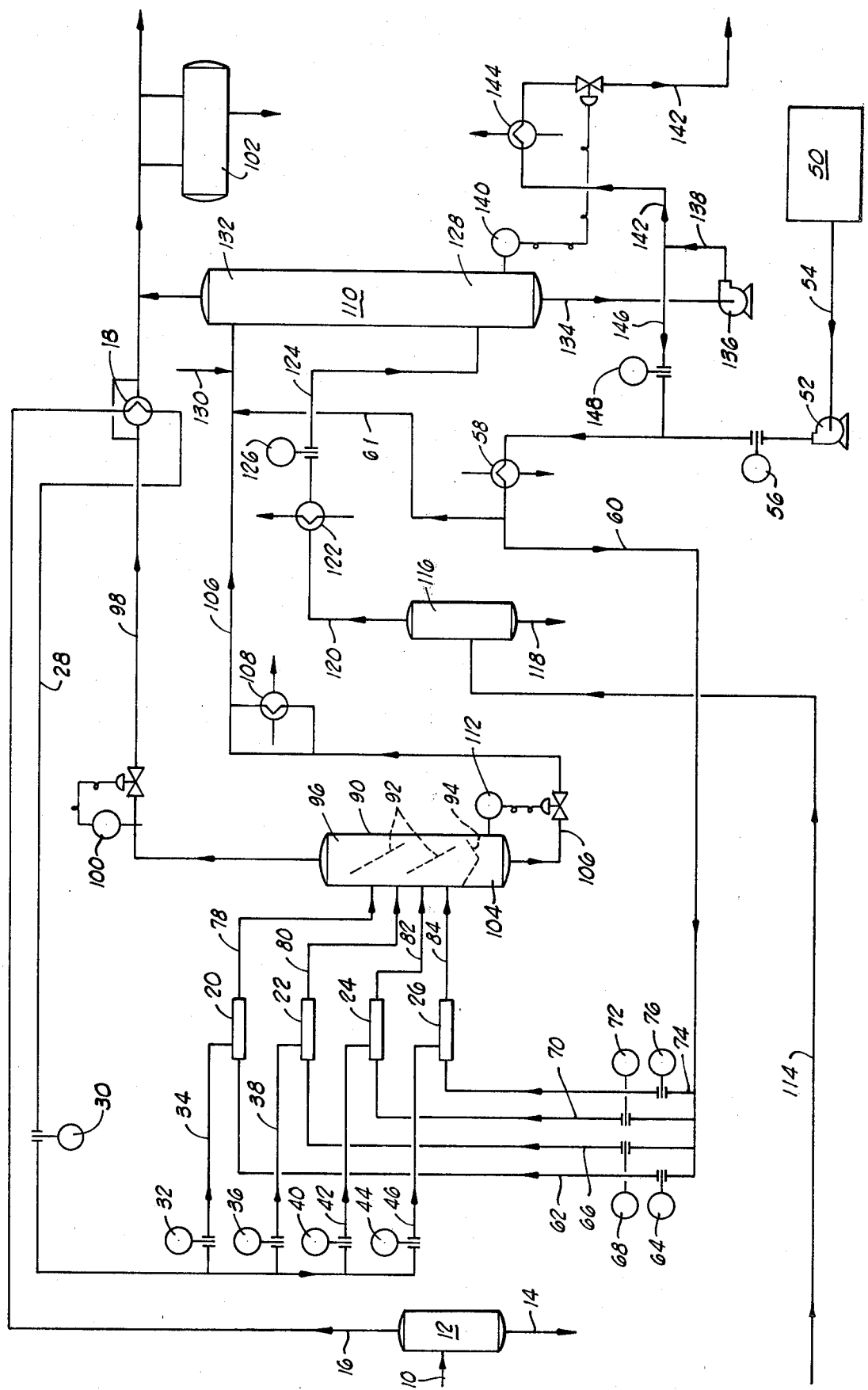

PROCESS FOR REMOVING HYDROGEN SULFIDE FROM SOUR GAS STREAMS

BACKGROUND OF THE INVENTION

1. Field of the Invention

This invention relates to a process for removing hydrogen sulfide from sour gas streams, and more particularly, but not by way of limitation, to a process for removing hydrogen sulfide from a sour gas stream to provide a sweet gas stream and an aqueous solution of sodium hydrosulfide.

2. Brief Description of the Prior Art

Processes have been known for producing sweet gas streams from sour gas streams and for producing aqueous solutions of sodium hydrosulfide from such sour gas streams. Typical of such processes is the process disclosed in U.S. Pat. No. 3,839,548 issued to Jackson. This patent discloses a process for producing sodium hydrosulfide solutions substantially free of sodium carbonate from a refinery sour gas stream by contacting the refinery sour gas stream with a fresh aqueous sodium hydroxide solution in continuous cocurrent interfacial two-phase flow, such as a thin film contact apparatus, separating the gas phase into a sweet gas substantially free of hydrogen sulfide, and recovering the aqueous phase as a sodium carbonate free solution of sodium hydrosulfide.

Another process for removing hydrogen sulfide from a refinery gas stream to provide sodium hydrosulfide solutions of high concentration is disclosed in Canadian Pat. No. 520,874 issued to Maschwitz. This patent discloses a process for manufacturing sodium hydrosulfide solutions from a refinery sour gas stream containing hydrogen sulfide wherein the refinery sour gas stream is contacted with an aqueous sodium hydroxide solution containing not less than about 25% by weight of solutes consisting essentially of sodium hydrosulfide and sodium sulfide. A portion of the absorbent withdrawn from the absorber and containing not less than 25% by weight of sodium hydrosulfide is mixed with fresh aqueous sodium hydroxide solution and recycled as fresh absorbent to the absorber for contact with additional amounts of the refinery sour gas stream. The amount of sodium hydrosulfide employed for mixing with the fresh sodium hydroxide solution is an amount sufficient to prevent precipitation of the sodium sulfide at the operating conditions of the absorber.

SUMMARY OF THE INVENTION

The present invention provides a process for removing hydrogen sulfide from sour gas streams to produce a sweet gas stream substantially free of hydrogen sulfide and an aqueous alkali metal hydrosulfide solution. Broadly, the process of the present invention comprises contacting a sour gas stream containing hydrogen sulfide with an aqueous solution of an alkali metal hydroxide to provide a mixed phase effluent, the alkali metal hydroxide being present in the aqueous solution in a stoichiometric excess based on the amount of hydrogen sulfide present in the sour gas stream; separating the mixed phase effluent into a gas phase and a partially spent aqueous alkali metal hydroxide phase; and recovering the gas phase as a sweet gas stream substantially free of the hydrogen sulfide.

In a more specific aspect, the process of the present invention comprises heating the partially spent aqueous alkali metal hydroxide phase to a temperature effective to remove carbon dioxide therefrom and provide a substantially carbon dioxide-free partially spent aqueous alkali metal hydroxide solution containing alkali metal hydrosulfide; contacting the substantially carbon dioxide-free partially spent aqueous alkali metal hydroxide solution containing alkali metal hydrosulfide with a substantially carbon dioxide free second sour gas stream containing hydrogen sulfide; and recovery a second sweet gas stream and a substantially alkali metal hydroxide-free aqueous solution of alkali metal hydrosulfide.

BRIEF DESCRIPTION OF THE DRAWING

A diagrammatic representation of the process for removing hydrogen sulfide from a sour gas stream, generally indicating the steps in the process of the present invention, is shown in the single FIGURE of the drawings.

DESCRIPTION OF THE PREFERRED EMBODIMENTS

As previously stated, the process of the present invention provides for the removal of hydrogen sulfide from sour gas streams to provide a sweet gas stream. In addition, the hydrogen sulfide present in the sour gas stream is converted into alkali metal hydrosulfide solutions, such as sodium hydrosulfide solutions which are useful in the sulfate paper industry.

The composition of the sour gas streams which can be treated by the process of the present invention is not critical and the sour gas streams can be derived from many different sources, such as various refining operations. Generally, the refinery sour gas streams consist of hydrogen and light hydrocarbons which are not readily condensed, such as methane, ethane, ethylene, propane, and propylene, although the refinery sour gas streams also may contain small amounts of the heavier $C_4$ and $C_5$ hydrocarbons. In addition, the refinery sour gas streams will contain varying amounts of hydrogen sulfide and, in certain instances, carbon dioxide. The presence of each of the before-mentioned contaminants, as well as the amounts of same in a refinery sour gas stream will vary depending on the nature of the feed stock to the refinery and the specific refinery processing operations from which the sour gas streams are recovered for use as a suitable feed in practicing the process of the present invention. Further, it generally is desirable to separate any condensed heavier hydrocarbons, that is, the hydrocarbons having more than 3 carbon atoms, from the sour gas stream prior to removing the hydrogen sulfide and, when applicable, the carbon dioxide, so that the hydrogen sulfide and carbon dioxide can be removed more efficiently and to prevent liquid hydrocarbon contamination of the aqueous alkali metal hydrosulfide solution.

As indicated previously, the sour gas streams which can be treated by the process of the present invention to remove hydrogen sulfide and carbon dioxide therefrom can vary widely. A typical refinery sour gas stream which can be employed in the process of the present invention is a sour gas stream having the following composition.

| CONSTITUENT | MOLE PERCENT |
|---|---|
| Hydrogen | 30.3% |
| Methane | 31.0% |
| $C_2$ Hydrocarbons | 17.6% |

-continued

| CONSTITUENT | MOLE PERCENT |
|---|---|
| $C_3$ Hydrocarbons | 8.0% |
| $C_4$ Hydrocarbons | 2.0% |
| $C_5$ Hydrocarbons | 0.8% |
| $C_6+$ Hydrocarbons | 0.3% |
| $H_2S$ | 7.8% |
| $CO_2$ | 2.2% |

However, it should be emphasized that any sour gas stream containing hydrogen sulfide can be subjected to the process of the present invention, as can sour gas streams containing both hydrogen sulfide and carbon dioxide.

The process of the present invention comprises contacting a first sour gas stream containing hydrogen sulfide with an aqueous alkali metal hydroxide solution in at least one static mixer reactor to provide a mixed phase effluent. The aqueous alkali metal hydroxide solution employed in the process of the present invention contains a stoichiometric excess of the alkali metal hydroxide, based on the amount of hydrogen sulfide present in the sour gas stream. The mixed phase effluent resulting from the intimate contacting and mixing of the first sour gas stream and the aqueous alkali metal hydroxide solution is recovered from the static mixer reactor and the mixed phase effluent is separated to provide a sweet gas stream and a partially spent aqueous alkali metal solution containing alkali metal hydrosulfide.

Any suitable alkali metal hydroxide can be employed as the alkali metal hydroxide constituent of the aqueous alkali metal hydroxide solution for removing hydrogen sulfide from a sour gas stream in accordance with the process of the present invention. However, it is most desirable to employ sodium hydroxide as the alkali metal hydroxide for reasons of economy and to produce solutions of sodium hydrosulfide which are useful in the paper and other industries.

The specific concentration of the sodium hydroxide in the aqueous sodium hydroxide solution used as the absorbing solution for the removal of hydrogen sulfide from the first sour gas stream is not particularly critical provided that the sodium hydroxide is present in the aqueous sodium hydroxide solution in an amount sufficient to provide a stoichiometric excess of sodium hydroxide in the aqueous sodium hydroxide solution, based on the amount of hydrogen sulfide present in the first sour gas stream. The amount of the aqueous sodium hydroxide solution injected into the static mixer reactor for contact with the first sour gas stream is dependent upon the amount of hydrogen sulfide present in the first sour gas stream, not the rate of flow of the first sour gas stream into and through the static mixer reactor. Generally, the first sour gas stream will contain from about 2 to 10 mole percent hydrogen sulfide. Aqueous sodium hydroxide solutions containing from about 10 to about 40 weight percent sodium hydroxide are suitable for use in practicing the present process. The amount of the aqueous sodium hydroxide solution employed in the practice of the present invention can vary widely, but the amount must be sufficient to provide a stoichiometric excess of sodium hydroxide, based on the amount of hydrogen sulfide present in the sour gas stream. Further, the stoichiometric excess of sodium hydroxide in the aqueous sodium hydroxide solution should be less than about 2 moles of sodium hydroxide per mole of the hydrogen sulfide present in the first sour gas stream.

The flow of the aqueous sodium hydroxide solution and the first sour gas stream into the static mixer reactor is in a continuous cocurrent flow so as to provide intimate mixing of the aqueous sodium hydroxide solution and the first sour gas stream. Preferably, the aqueous sodium hydroxide solution is atomized in the static mixer reactor to improve contact surface between the aqueous sodium hydroxide solution and the first sour gas stream.

One or more static mixer reactors can be used in practicing the process of the present invention. The static mixer reactors are designed to achieve high-velocity, short-contact-time, and intimate mixing of the aqueous sodium hydroxide solution and the first sour gas stream. The contact times between the first sour gas stream and the aqueous sodium hydroxide solution desirably are kept very short in order to provide for high selective absorption of hydrogen sulfide as opposed to carbon dioxide. Thus, it is preferred that the contact time of the first sour gas stream with the aqueous sodium hydroxide solution in the static mixer reactor be from about 0.01 to about 1 second and more preferably, less than about 0.1 second. This can be achieved by maintaining the first sour gas stream at a relatively high linear velocity. In general, the first sour gas stream feed is maintained at a velocity of from about 60 to about 150 feet per second and, more desirably, from about 80 to about 100 feet per second.

The temperature and pressure conditions of the present process are not critical. However, it is preferred that high temperatures and pressure be avoided in order to maintain a high efficiency in the selective absorption of the hydrogen sulfide, especially if carbon dioxide is present in the first sour gas stream feed. Thus, it is preferred to maintain the first sour gas stream and the aqueous sodium hydroxide solution, while same as being contacted in the static mixer reactors, at a temperature in the range of from about 30° F. to about 200° F. and, more preferably, below 125° F. Likewise, it is preferred that the pressure in the static mixer reactors be maintained between atmospheric pressure and about 200 p.s.i.g. and, more preferably, between about 50 p.s.i.g. and 150 p.s.i.g.

The reaction between the hydrogen sulfide in the first sour gas stream and the sodium hydroxide in the aqueous sodium hydroxide solution is exothermic in nature. Thus, it may be desirable to provide some means for removing the heat of reaction from the static mixer reactors, either by cooling fluid or otherwise, in order to maintain the temperature at which the first sour gas stream is contacted with the aqueous sodium hydroxide solution in the desired range.

As previously indicated the amount of the aqueous sodium hydroxide solution required in carrying out the process of the present invention is an amount sufficient to insure that a stoichiometric excess of sodium hydroxide, based on the amount of hydrogen sulfide present in the first sour gas stream, is present in the aqueous sodium hydroxide solution contacted with the first sour gas stream in the static mixer reactors to provide the mixed phase effluent, an effluent having a gas phase and a liquid phase. The gas phase of the mixed phase effluent is a sweet gas stream substantially free of hydrogen sulfide; and the liquid phase of the mixed phase effluent is a partially spent aqueous sodium hydroxide solution containing sodium hydrosulfide. The sweet gas stream so produced will contain generally less than about 0.1 percent by volume hydrogen sulfide and often less than 0.01 percent hydrogen sulfide. Thus, upon combustion of the sweet gas stream substantially no $SO_x$ emissions are given off.

The gas phase of the mixed phase effluent is separated from the liquid phase by passing the mixed phase effluent through a liquid-gas separator. The temperature and pressure at which the liquid-gas separator is maintained to effect the efficient separation of the liquid phase from the gas phase of the mixed phase effluent can vary widely. However, it is preferred that the liquid-gas separator be operated at effective temperatures and pressures to effect efficient gas-liquid separation and to maintain a proper liquid level in the liquid-gas separator.

The partially spent aqueous sodium hydroxide solution recovered as the liquid phase from the liquid-gas separator contains sodium hydrosulfide and, in some instances minor amounts of sodium carbonate. The partially spent aqueous sodium hydroxide solution recovered from the mixed phase effluent may be heated to a temperature of at least about 150° to assist in the removal of reacted carbon dioxide which may be present in the partially spent aqueous sodium hydroxide solution. The partially spent aqueous sodium hydroxide solution is then contacted with a second sour gas stream containing hydrogen sulfide in a continuous countercurrent flow absorber so that the hydrogen sulfide in the second sour gas stream can be converted to sodium hydrosulfide, and any carbon dioxide present in the partially spent aqueous sodium hydroxide solution can be removed by stripping in the absorber. The partially spent aqueous sodium hydroxide solution may contain less than a stoichiometric amount of sodium hydroxide, based on the amount of hydrogen sulfide present in the second sour gas stream. Thus, it may be necessary to mix an effective amount of a fresh sodium hydroxide solution with the partially spent aqueous sodium hydroxide solution to provide a resulting aqueous sodium hydroxide solution containing a stoichiometric amount of sodium hydroxide.

The temperature and pressure conditions at which the partially spent aqueous sodium hydroxide solution, or the resulting aqueous sodium hydroxide solution as the case may be, containing a stoichiometric amount of sodium hydroxide is contacted with the second sour gas stream in a continuous countercurrent flow absorber are not critical. However, it is preferred to operate the continuous countercurrent flow absorber at conditions so that the resulting aqueous sodium hydroxide solution containing a stoichiometric amount of sodium hydroxide and the second sour gas stream are contacted at a temperature of from about 50° F. to about 200° F., and at a pressure of from atmospheric to about 150 p.s.i.g. Since there is substantially no carbon dioxide in the second sour gas stream, the contact time between the resulting aqueous sodium hydroxide solution and the second sour gas stream is not critical. Generally, a gas contact time of at least about 10 seconds will insure that the resulting aqueous sodium hydroxide solution containing a stoichiometric amount of sodium hydroxide is contacted with the second sour gas stream in an efficient manner to insure that the hydrogen sulfide present in the second sour gas stream is converted into sodium hydrosulfide.

When the reaction between the hydrogen sulfide in the second sour gas stream and the sodium hydroxide in the resulting aqueous sodium hydroxide solution has been completed in the continuous countercurrent flow absorber a sweet gas is recovered from the continuous countercurrent flow absorber, as well as a substantially caustic-free aqueous sodium hydrosulfide solution.

The substantially caustic-free aqueous sodium hydrosulfide solution produced as described above generally will contain from about 10 to about 40 weight percent sodium hydrosulfide and less than about 5.0 weight percent sodium carbonate. The substantially caustic-free aqueous sodium hydrosulfide solutions are useful in the paper industry, while the sweet gas stream relatively free of hydrogen sulfide is suitable for further processing or burning as fuel for refinery operations.

The direct contact of hydrogen sulfide with an aqueous sodium hydroxide solution containing a stoichiometric excess of sodium hydroxide, based upon the amount of hydrogen sulfide present in the first sour gas stream, in the static mixer reactions may cause precipitation of sulfides at the operating conditions employed in the continuous process. The precipitation or salting out of sulfides may result in clogging of the reactors and downstream equipment. However, the precipitation or salting out of the sulfides can be eliminated by recycling a sufficient volume of the substantially caustic-free aqueous sodium hydrosulfide solution to the static mixer reactors. Preferably, such is accomplished by admixing an effective amount of the substantially caustic-free aqueous sodium hydrosulfide solution with the fresh aqueous sodium hydroxide solution containing a stoichiometric excess of sodium hydroxide prior to introducing same into the static mixer reactors. The amount of the substantially caustic-free aqueous sodium hydrosulfide solution employed to prevent precipitation or salting out of the sulfides in the static mixer reactors can vary widely, but generally will be an amount sufficient to provide a concentration of sodium sulfide in the aqueous sodium hydroxide solution introduced into the static mixers of less than about 10 weight percent. Thus, the formation of solid sodium sulfides can be avoided by maintaining sufficient recycling of the aqueous caustic-free hydrosulfide solution relative to the aqueous sodium hydroxide solution fed to the static mixer reactors such that the saturation point of the resultant solution for sodium sulfides is never reached.

In addition to providing the desired control of the precipitation or salting out of sulfides, the recycling of the before-mentioned amount of the caustic-free aqueous sodium hydrosulfide solution provides a larger liquid heat sink in the static mixer reactors and thus helps prevent high-temperature caustic embrittlement of non-stress-relieved carbon steel equipment containing caustic concentrations over 20 weight percent. Further, the use of the recycled caustic-free aqueous sodium hydrosulfide solution improves reactor performance (that is, lower sodium carbonate content and higher sulfidity) by assisting in atomization of the aqueous sodium hydroxide solution.

The process of the present invention has been found to be particularly advantageous because it affords highly selective absorption of hydrogen sulfide from a first sour gas stream as opposed to the absorption of carbon dioxide present in the first sour gas stream. Further, by the use of the stoichiometric excess of the sodium hydroxide in the static mixer reactors, based on the amount of hydrogen sulfide present in the first sour gas stream, together with the concept of recycling a specified amount of the substantially caustic-free aqueous sodium hydrosulfide solution to the static mixer reactors for contact with the first sour gas stream and the aqueous sodium hydroxide solution, precipitation or salting out of sulfides in the static mixer reactors and downstream equipment can be eliminated. In addition, the partially spent aqueous sodium hydroxide solution containing sodium hydrosulfide can be contacted with a second sour gas stream substantially free of carbon dioxide to remove the hydrogen sulfide therefrom and provide a second sweet gas stream and the substantially caustic-free aqueous sodium hydrosulfide solution for use in the paper industry.

It is apparent that the present invention can be carried out in any type of reactor wherein the aqueous sodium hydroxide solution containing a stoichiometric excess of sodium hydroxide is contacted with the first sour gas stream to form a mixed-phase effluent and the partially spent sodium hydroxide solution recovered from the mixed phase effluent is contacted with a substantially carbon dioxide-free second sour gas stream containing hydrogen sulfide in a continuous counterflow absorber.

Referring to FIG. 1 of the drawing, a diagrammatic representation of the process of the present invention is illustrated, including certain ancilliary supply and control means. A first sour gas stream, containing measurable amounts up to about 30 mole percent hydrogen sulfide, generally from about 0.1 to about 10 mole percent hydrogen sulfide, and measurable amounts up to about 20 mole percent carbon dioxide, generally from about 0.1 to about 5 mole percent carbon dioxide, is brought to the process by line 10 and passed to a liquid separator 12 wherein any moisture and hydrocarbons heavier than $C_3$ which have condensed will be removed for other use via line 14. The first sour gas stream, freed of liquids, is then passed via line 16 to a heat exchanger 18 for establishing the first sour gas stream at the desired temperature for inlet into one or more of a plurality of static mixer reactors 20, 22, 24 and 26. The heat exchanger 18 is a conventional heat exchanger well known in the art. From the heat exchanger 18, the first sour gas stream (now at the desired inlet temperature) is passed through line 28 and flow meter 30 to one or more of the static mixer reactors 20, 22, 24 and 26 via flow meter 32 and line 34, flow meter 36 and line 38, flow meter 40 and line 42, or flow meter 44 and line 46, respectively, as shown in the drawing. When the static mixer reactors 20 and 22 are reactors having a two inch diameter, and the static mixer reactors 24 and 26 are reactors having a three inch diameter, the gas flow of the first sour gas stream through the static mixer reactors 20, 22, 24 and 26 will distribute itself under constant pressure drop so that about two and one-half times as much of the first sour gas stream will pass through the three inch diameter reactors 24, 26 as through the two inch diameter reactors 20, 22. Thus, step increments of at least one-seventh of maximum flow capability are provided by proper selection of the static mixer reactors.

An aqueous solution of sodium hydroxide having a stoichiometric excess of sodium hydroxide, based on the amount of hydrogen sulfide present in the first sour gas stream, is stored in a caustic storage tank 50 and pumped by pump 52 via line 54 through flow control meter 56 to a heat exchanger 58. The heat exchanger 58 adjusts the temperature of the aqueous sodium hydroxide solution to the desired temperature prior to injecting the aqueous sodium hydroxide solution into one or more of the static mixer reactors 20, 22, 24 and 26. The heat exchanger 58, a conventional heat exchanger well known in the art, is supplied with sources of steam for heating the aqueous sodium hydroxide solution to a predetermined temperature, or cooling water for cooling the aqueous sodium hydroxide solution to a predetermined temperature. From the heat exchanger 58 the aqueous sodium hydroxide solution of adjusted temperature is passed through line 60 into one or more of the static mixer reactors 20, 22, 24 and 26 via line 62 and flow control meter 64, line 66 and flow control meter 68, line 70 and flow control meter 72, and line 74 and flow control meter 76, respectively. The aqueous sodium hydroxide solution is desirably atomized in the static mixer reactors 20, 22, 24 and 26 and contacted with the first sour gas stream at high velocity and short-contact-time to provide a mixed phase effluent which exits the static mixer reactors 20, 22, 24 and 26 via lines 78, 80, 82 and 84, respectively. It should be noted that the sodium hydroxide requirement used in the process of the present invention is dependent on the amount of hydrogen sulfide present in the first sour gas stream, not the rate of flow of the first sour gas stream through the static mixer reactors 20, 22, 24 and 26.

The static mixer reactors 20, 22, 24 and 26 are designed to achieve high-velocity, short-contact-time, and intimate mixing of the aqueous sodium hydroxide solution and the first sour gas stream. Typical velocities of the first sour gas stream in the static mixer reactors 20, 22, 24 and 26 are from about 60 to 150 feet per second, preferably from about 80 to 100 feet per second, with a contact time of from about 0.01 to 1 second, preferably less than about 0.1 second, conditions which favor selective absorption of hydrogen sulfide over carbon dioxide.

The mixed phase effluent resulting from the intimate mixing of the aqueous sodium hydroxide solution and the first sour gas stream in one or more of the static mixer reactors 20, 22, 24 and 26 is passed from the static mixer reactors 20, 22, 24 and 26 into a gas-liquid separator 90 via lines 78, 80, 82 and 84, respectively. The high-velocity, mixed-phase effluent from the static mixer reactors 20, 22, 24 and 26 impinges on sloped target plates 92 (indicated by phantom lines) in the gas-liquid separator 90 so that the gas phase and the liquid phase of the mixed phase effluent can be separated rapidly. An internal cone 94 (also indicated by phantom lines) is disposed in a lower portion 104 of the gas-liquid separator 90 to further minimize contact of the carbon dioxide-laden gas phase with the liquid phase in the bottom of the gas-liquid separator 90. The gas phase of the mixed phase effluent, a sweet gas, which is freed from the liquid in the gas-liquid separator 90, is withdrawn from an upper portion 96 of the gas-liquid separator 90 via line 98 for subsequent storage, and/or use as a sweet gas fuel. The flow of the sweet gas from the upper portion 96 of the gas-liquid separator 90 via line 98 is controlled by pressure controller 100. The sweet gas can be passed, if desired, through the heat exchanger 18 and into a knockout drum 102 so that any entrained liquids in the sweet gas can be separated from the sweet gas in the knockout drum 102. The sweet gas flows from the knockout drum 102 to a storage assembly not shown.

The liquid phase of the mixed phase effluent, a partially spent aqueous sodium hyroxide solution containing sodium hydrosulfide, is withdrawn from a lower portion 104 of the gas-liquid separator 90 via line 106, passed through a heat exchanger 108 and into a countercurrent tray absorber 110. The level of the partially spent aqueous sodium hydroxide solution containing sodium hydrosulfide in the gas-liquid separator 90 is maintained at a desired level by controlling the rate of withdrawal of the liquid phase from the gas-liquid separator 90 by level controller 112.

The partially spent aqueous sodium hydroxide solution containing sodium hydrosulfide is contacted with a second sour gas stream containing a measurable amount of up to about 30 mole percent hydrogen sulfide, generally from about 0.1 to about 10 mole percent hydrogen sulfide, in the countercurrent tray absorber 110. The second sour gas stream which can be treated in accordance with the process of the present invention is substantially free of carbon dioxide contamination.

Sour gas from any of many various refinery operations, such as hydrocracking, hydrotreating, or crude distillation, can be employed as the second sour gas stream. The second sour gas stream is brought to the process by line 114 and passed to a liquid separator 116 wherein any moisture and hydrocarbons heavier than $C_3$ which have condensed will be removed from the second sour gas stream. The separated liquids can be removed from the liquid separator 116 via line 118 for other uses.

The second sour gas stream, freed of liquid hydrocarbons, passes from the liquid separator 116 via line 120 to a heat exchanger 122 wherein the temperature of the second sour gas stream is adjusted to the desired temperature. The heat exchanger 122, a conventional heat exchanger well known in the art, is supplied with sources of steam for heating the second sour gas stream to a predetermined temperature, or cooling water, if required, for cooling the second sour gas stream to a predetermined temperature. From the heat exchanger 122 the second sour gas stream, now at the desired temperature, is passed via line 124 and flow meter 126 into a lower section 128 of the countercurrent tray absorber 110.

As previously stated, the second sour gas stream is substantially free of carbon dioxide. However, in those instances where trace amounts of carbon dioxide are detected in the second sour gas stream, the second sour gas stream may be heated to a temperature of at least about 150° F. so so that the carbon dioxide can be removed from the second sour gas stream in the countercurrent tray absorber 110. The second sour gas stream, substantially free of carbon dioxide, is contacted with the partially spent aqueous sodium hydroxide solution recovered from the gas-liquid separator 90 in the countercurrent tray absorber 110 for an effective period of time to insure removal of the hydrogen sulfide from the second sour gas stream and provide a sweet gas phase and a substantially caustic-free aqueous sodium hydrosulfide solution having a high sulfidity.

In order to achieve the above, an effective amount of fresh sodium hydroxide solution may be admixed with the partially spent aqueous sodium hydroxide solution containing sodium hydrosulfide to provide a resulting aqueous sodium hydroxide solution containing a stoichiometric amount of sodium hydroxide therein, based on the amount of hydrogen sulfide present in the second sour gas stream. The resulting aqueous sodium hydroxide solution, which contains sodium hydrosulfide, is injected into the upper portion 132 of the countercurrent tray absorber 110.

The fresh sodium hydroxide solution can be injected into line 106 by a pump (not shown) via line 130, or fresh sodium hydroxide solution from the caustic storage tank 50 can be injected into line 106 via line 54, pump 52 and line 61, so that the fresh aqueous sodium hydroxide solution is thoroughly admixed with the partially spent aqueous sodium hydroxide solution containing sodium hydrosulfide to form the resulting aqueous sodium hydroxide solution prior to injecting same into the upper portion 132 of the countercurrent tray absorber 110.

The amount of fresh aqueous sodium hydroxide solution required to form the resulting aqueous sodium hydroxide solution can vary widely and will be dependent upon the amount of sodium hydroxide present in the partially spent aqueous sodium hydroxide solution recovered from the gas-liquid separator 90. However, care must be exercised to insure that the amount of fresh aqueous sodium hydroxide solution admixed with the partially spent aqueous sodium hydroxide solution is only that amount required to provide a stoichiometric amount of sodium hydroxide in the resulting aqueous sodium hydroxide solution, based on the amount of hydrogen sulfide present in the second sour gas stream.

The residence time of the second sour gas stream and the resulting aqueous sodium hydroxide solution in the counter-current tray absorber 110 can vary depending on the gas flow of the second sour gas stream. Generally, a gas residence time of at least about 10 seconds is sufficient to enable a second sour gas stream containing from about 2 to about 5 mole percent hydrogen sulfide to effectively contact the resulting aqueous sodium hydroxide solution in the counter-current tray absorber 110.

Once the second sour gas stream and the resulting aqueous sodium hydroxide solution have been contacted for an effective period of time in the countercurrent tray absorber 110, a sweet gas is separated from the aqueous solution in the upper section 132 of the countercurrent tray absorber 110, from which it passes into knockout drum 102 or directly to a storage assembly, not shown; and a substantially sodium hydroxide free aqueous sodium hydrosulfide solution is separated and collected in the lower section 128 of the countercurrent tray absorber 110. The substantially sodium hydroxide-free aqueous sodium hydrosulfide solution is withdrawn from the lower section 128 of the countercurrent tray absorber 110 via line 134, passed through a pump 136 and into line 138. The level of the substantially sodium hydroxide free aqueous sodium hydrosulfide solution in the lower section 128 of the countercurrent tray absorber 110 is maintained by level controller 140 which also controls the rate of flow of the substantially sodium hydroxide-free aqueous sodium hydrosulfide solution from the countercurrent tray aborber 110.

The substantially sodium hydroxide-free aqueous sodium hydrosulfide solution withdrawn from the lower section 128 of the countercurrent tray absorber 110 is passed via line 142 through a heat exchanger 144 for establishing the substantially sodium hydroxide-free aqueous solution of sodium hydrosulfide at a desired temperature for storage and/or shipping (not shown).

The direct contact of the first sour gas stream with an aqueous sodium hydroxide solution having a stoichiometric excess of sodium hydroxide, based on the hydrogen sulfide content of the first sour gas stream, may cause precipitation of sulfides in the static mixer reactors 20, 22, 24 and 26 at the normal operating conditions of the static mixer reactors 20, 22, 24 and 26. However, the precipitation of sulfides in the static mixer reactors 20, 22, 24 and 26 can be eliminated by recycling a portion of the substantially sodium hydroxide-free aqueous sodium hydrosulfide solution recovered from the countercurrent tray absorber 110 to the static mixer reactors 20, 22, 24 and 26. Thus, an effective amount of the substantially sodium hydroxide free aqueous sodium hydrosulfide solution is passed via line 146 and admixed with the aqueous sodium hydroxide solution containing a stoichiometric excess of sodium hydroxide in line 60 prior to introducing the aqueous sodium hydroxide solution into the static mixers 20, 22, 24 and 26. The rate of flow of the substantially sodium hydroxide-free sodium hydrosulfide solution through line 146 is controlled via flow control meter 148.

The amount of the substantially sodium hydroxide-free aqueous sodium hydrosulfide solution employed as a recycle in the process of the present invention can vary widely and will be dependent to a large degree upon the amount of hydrogen sulfide present in the first sour gas stream and the stoichiometric excess of sodium hydroxide present in the aqueous sodium hydroxide solution. However, care should be exercised to insure that the saturation point of sodium sulfide in the resulting solution of the aqueous sodium hydroxide solution and the recycled sodium hydroxide-free aqueous sodium hydrosulfide solution is never reached. Such generally can be accomplished if the substantially sodium hydroxide-free aqueous sodium hydrosulfide solution is recycled to the static mixer reactors 20, 22, 24 and 26, along with the aqueous sodium hydroxide solution containing the stoichiometric excess of sodium hydroxide in an amount sufficient to insure that the resulting solution contains a ratio of recycled aqueous sodium hydrosulfide solution to fresh aqueous sodium hydroxide solution of at least about 3:1.

In order to more fully describe the present invention the following example is set forth. However, it is to be understood that the example is for illustrative purposes only and is not to be construed as limiting the scope of the present invention as defined in the appended claims.

EXAMPLE

In order to demonstrate the process of the present invention, a unit was constructed having the essential elements shown in the drawing, namely the liquid separator 12, four static mixer reactors 20, 22, 24 and 26, the gas-liquid separator 90, the countercurrent tray absorber 110, and the liquid separator 116. Data was collected over a two-month period of operation wherein two of the static mixer reactors were employed, i.e., a two inch diameter static mixer reactor and a three inch diameter static mixer reactor.

Nominal operating pressures during the two-month period of operation during which the data were collected were maintained as follows: 125 to 130 p.s.i.g. in the two static mixer reactors; 100 to 110 p.s.i.g. in the gas-liquid separator 90; and 60 to 70 p.s.i.g. in the countercurrent tray absorber 110.

Unit operating temperatures were maintained as follows: 10° F. to 105° F. for the first sour gas stream injected into the static mixer reactors (refrigeration occured at times to cool the first sour gas stream due to expansion of light ends in the first sour gas stream); 70° F. to 140° F. for the gas phase being withdrawn from the gas-liquid separator 90; 80° F. to 160° F. for the aqueous sodium hydroxide solution injected into the static mixer reactors; and 85° F. to 140° F. for the partially spent aqueous sodium hydroxide solution containing sodium hydrodulfide withdrawn from the gas-liquid separator 90.

The three-inch diameter static mixer reactor was equipped with mixing elements having a length of $17\frac{1}{4}$ inches; and the two-inch diameter static mixer reactor was equipped with mixing elements having a length of $12\frac{1}{2}$ inches.

The first sour gas stream, which contained varying amounts of hydrogen sulfide and carbon dioxide, was introduced into the two static mixer reactors and the first sour gas stream divided so that an approximate ratio of 5 to 2 of the first sour gas stream passed through the 3-inch diameter reactor and the 2-inch diameter reactor, respectively. The flow rate of the aqueous sodium hydroxide solution into each of the static mixer reactors was proportionately matched to the flow rate of the first sour gas stream. Calculations indicated velocities of 60 to 110 feet per second were achieved in the two inch diameter static mixer reactor, 70 to 130 feet per second velocities were achieved in the three inch diameter static mixer reactor, and the residence time for the first sour gas stream in the two static mixer reactors was generally between 0.01 and 0.02 seconds.

The temperature of the second sour gas stream directed to the countercurrent tray absorber 110 was maintained in a range of 80° F. to 180° F., and the temperature of the sweet gas exiting the countercurrent tray absorber 110 was in the range of 90° F. to 140° F. The temperature of the partially spent aqueous sodium hydroxide solution containing sodium hydrosulfide withdrawn from the gas-liquid separator 90 and passed to the countercurrent tray absorber 110 was between 85° F. and 140° F., and the temperature of the substantially sodium hydroxide-free sodium hydrosulfide solution exiting the countercurrent tray absorber 110 was between 90° F. and 145° F.

The temperature of the second sour gas stream directed to the liquid separator 116 and thus to the countercurrent tray absorber 110 was sufficiently low most of the time so that springing of carbon dioxide was not achieved. The level of sodium carbonate in the aqueous sodium hydrosulfide solution is partially attributable to the presence of sodium carbonate in the fresh, aqueous sodium hydroxide solution injected into the static mixer reactors. However, it is believed that the carbon dioxide can be sprung from the substantially sodium hydroxide-free aqueous sodium hydrosulfide solution by heating the second sour gas stream to a temperature of at least about 150° F. prior to directing the second sour gas stream into the countercurrent tray absorber 110 for contact with a similarly heated partially spent aqueous sodium hydroxide solution containing sodium hydrosulfide recovered from the gas-liquid separator 90.

As one should expect, the hydrogen sulfide content and the carbon dioxide content of the first sour gas stream varied from day to day. Similarly, the hydrogen sulfide content of the second sour gas stream varied from day to day.

In the data tabulated hereinafter attention is directed to the data represented by the days 2/27, 3/24 and 4/11, each of which represent experiments conducted when a severe shortage of sodium hydroxide was injected into the static mixer reactors. In such instances, the bottoms from the gas-liquid separator 90 (that is, the partially spent aqueous sodium hydroxide solution containing sodium hydrosulfide) contained little or no excess sodium hydroxide as indicated by an analysis of the $Na_2S$ content. Thus, removal of hydrogen sulfide from the first sour gas stream was less than desired while removal of hydrogen sulfide from the second sour gas stream by the countercurrent tray absorber 110 was severely limited.

On the other hand, the data represented by the days 3/10 and 3/12 indicated an excess of sodium hydroxide in the bottoms from the countercurrent tray absorber 110 (that is, the substantially sodium hydroxide-free sodium hydrosulfide solution). However, the spot analytical results on removal of hydrogen sulfide gas from the second sour gas stream do not confirm such a surplus of sodium hydroxide.

In contrast, the stoichiometric balances of the sodium hydroxide employed on the days 2/29, 3/14, 3/19, 3/21, 4/2, and 4/7 indicate good hydrogen sulfide removal from the first sour gas stream directed to the static mixer reactors and the second sour gas stream directed to the countercurrent tray absorber 110, with exceptional hydrogen sulfide removal from both streams being illustrated by the data representing the days 3/14 and 4.7.

REACTOR-SEPARATOR SYSTEM

| 1980 Date | Gas to Reactors Mscfd | % $H_2S$ | % $CO_2$ | Gas from Separator % $H_2S$ | % $CO_2$ | Fresh Caustic In[1] gpm | % NaOH | % $Na_2CO_3$ | Separator Bottoms[2] % NaHS | % $Na_2S$ | % $Na_2CO_3$ |
|---|---|---|---|---|---|---|---|---|---|---|---|
| 2-25 | 5,550 | 2.0 | 0.7 | 0.02 | — | 13.75 | 20.49 | 0.71 | 18.99 | 2.18 | 4.63 |
| 27 | 5,600 | 1.8 | 0.5 | 0.10 | — | 8.11 | 20.23 | 0.88 | 21.93 | — | 5.19 |
| 29 | 4,590 | 0.4 | 2.1 | 0.002 | 1.0 | 9.99 | 20.29 | 0.90 | 19.33 | 2.18 | 3.52 |
| 3-3 | 5,200 | — | 1.5 | 0.001 | 1.0 | 9.89 | 20.12 | 1.06 | 19.06 | 2.15 | 4.37 |
| 5 | 5,145 | 2.2 | 0.2 | 0.03 | 0.9 | 8.80 | 20.49 | 0.53 | 19.97 | 1.91 | 4.08 |
| 7 | 4,945 | 4.2 | — | 0.001 | — | 9.89 | 20.20 | 0.89 | 18.83 | 2.70 | 4.23 |
| 10 | 5,400 | 1.6 | 1.4 | 0.02 | 1.2 | 8.70 | 20.46 | 0.85 | 19.41 | 2.70 | 2.94 |
| 12 | 5,400 | 1.9 | 1.6 | 0.001 | 0.7 | 7.52 | 20.36 | 0.88 | 14.41 | 5.50 | 5.04 |
| 14 | 3,630 | 2.2 | 1.3 | 0.004 | 0.8 | 7.52 | 20.22 | 0.88 | 17.28 | 3.52 | 4.59 |
| 17 | 3,935 | 3.4 | 1.2 | 0.03 | 1.0 | 8.31 | 20.63 | 0.90 | 20.56 | 1.37 | 3.92 |
| 19 | 4,035 | 2.1 | 1.6 | 0.01 | 1.1 | 8.70 | 21.55 | 0.68 | 17.84 | 4.09 | 4.06 |
| 21 | 5,045 | 1.1 | 1.6 | 0.002 | 0.8 | 9.10 | 21.69 | 0.88 | 16.35 | 4.68 | 4.03 |
| 24 | 5,350 | 4.7 | 1.4 | 0.50 | 1.5 | 9.86 | 20.71 | 0.71 | 22.78 | — | 2.59 |
| 26 | 5,145 | 2.7 | 0.6 | 0.02 | 1.0 | 8.31 | 20.62 | 0.61 | 18.14 | 3.74 | 3.82 |
| 28 | 4,135 | 1.4 | 1.9 | 0.02 | 0.8 | 8.51 | 21.42 | 0.41 | 18.14 | 3.74 | 3.82 |
| 31 | 4,845 | 1.0 | 2.3 | 0.001 | 1.0 | 11.08 | 21.11 | 0.41 | 17.70 | 3.74 | 3.82 |
| 4-2 | 5,045 | 2.2 | 1.5 | 0.003 | 0.7 | 11.27 | 21.96 | 0.41 | 15.77 | 5.57 | 3.78 |
| 7 | 5,045 | 2.2 | 1.3 | — | 0.9 | 8.51 | 21.64 | 0.81 | 14.11 | 7.49 | 3.60 |
| 9 | 5,750 | 2.2 | 0.8 | — | 1.4 | 8.70 | 22.30 | 0.81 | 19.55 | 3.40 | 3.57 |
| 11 | 5,550 | 2.2 | — | 0.30 | 1.1 | 6.92 | 23.26 | 0.20 | 24.66 | 0.31 | 3.15 |
| 14 | 6,860 | 0.5 | * | 0.002 | 1.3 | 9.30 | 22.17 | 0.81 | 22.14 | 2.20 | 2.99 |
| 16 | 6,355 | 0.08 | 1.4 | 0.01 | 1.3 | 7.91 | 23.01 | 0.40 | 21.50 | 3.12 | 2.76 |
| 18 | 6,760 | — | — | — | — | 7.52 | 23.85 | 0.34 | 21.95 | 2.81 | 2.76 |
| 21 | 6,155 | 1.1 | 0.7 | 0.03 | * | 6.33 | 23.65 | 0.50 | 22.30 | 1.87 | 2.97 |
| 23 | 7,065 | 0.4 | 1.6 | 0.001 | 1.2 | 6.73 | 23.81 | 0.50 | 22.40 | 2.18 | 3.39 |

[1]Nominal Specific Gravity = 1.25
[2]Nominal Specific Gravity = 1.20
—Nil by analysis
*Not determined

ABSORBER SYSTEM

| 1980 Date | Gas to Absorber Mscfd | % $H_2S$ | Gas from Absorber % $H_2S$ | Absorber Bottoms[3] % NaHS | % $Na_2S$ | % $Na_2CO_3$ | Recycle to Reactors[4] gpm | Ratio to Fresh |
|---|---|---|---|---|---|---|---|---|
| 2-25 | 4,670 | 4.0 | 0.3 | 21.35 | — | 4.78 | 58.98 | 4.29 |
| 27 | 4,080 | 4.6 | 2.9 | 21.55 | — | 5.14 | 47.18 | 5.82 |
| 29 | 4,235 | 3.3 | — | 22.71 | — | 3.71 | 29.98 | 3.00 |
| 3-3 | 3,565 | 3.1 | 0.2 | 22.32 | — | 4.26 | 29.00 | 2.93 |
| 5 | 4,195 | 4.2 | 0.9 | 22.71 | — | 3.89 | 27.50 | 3.13 |
| 7 | 3,730 | 3.4 | 0.6 | 22.90 | — | 3.52 | 28.37 | 2.87 |
| 10 | 4,235 | 2.3 | 0.4 | 22.12 | 0.27 | 4.08 | 25.55 | 2.94 |
| 12 | 3,680 | 2.6 | 1.4 | 19.97 | 0.82 | 5.18 | 25.06 | 3.33 |
| 14 | 2,850 | 2.8 | 0.01 | 22.33 | — | 4.04 | 24.57 | 3.27 |
| 17 | 4,040 | 2.4 | 1.0 | 22.71 | — | 4.08 | 24.57 | 2.96 |
| 19 | 4,115 | 2.4 | 0.1 | 23.49 | — | 4.06 | 20.64 | 2.37 |
| 21 | 4,355 | 2.6 | 0.1 | 23.72 | — | 2.99 | 20.64 | 2.27 |
| 24 | 3,960 | 2.4 | 2.2 | 23.27 | — | 2.35 | 19.66 | 1.99 |
| 26 | 4,195 | 2.4 | 0.2 | 23.52 | — | 3.39 | 19.66 | 2.37 |
| 28 | 3,960 | 3.0 | 0.4 | 23.52 | — | 3.18 | 19.66 | 2.31 |
| 31 | 4,115 | 3.2 | 0.5 | 22.62 | — | 3.82 | 20.64 | 1.86 |
| 4-2 | 4,195 | 3.4 | 0.1 | 23.52 | — | 3.82 | 20.64 | 1.83 |
| 7 | 4,355 | 2.2 | — | 23.97 | — | 3.60 | 13.76 | 1.62 |
| 9 | 4,355 | 2.6 | 0.4 | 24.21 | — | 3.57 | 20.64 | 2.37 |
| 11 | 4,355 | 2.8 | 2.3 | 24.88 | — | 3.36 | 17.69 | 2.56 |
| 14 | 3,960 | 3.4 | 1.3 | 25.30 | — | 3.21 | 20.64 | 2.22 |
| 16 | 4,590 | 3.8 | 1.2 | 25.76 | — | 2.76 | 21.62 | 2.73 |
| 18 | 4,195 | 1.2 | 1.4 | 25.54 | — | 2.76 | 19.66 | 2.61 |
| 21 | 3,485 | 3.1 | 1.8 | 25.76 | — | 2.97 | 20.65 | 3.26 |
| 23 | 3,165 | 2.4 | 1.4 | 26.42 | — | 3.45 | 19.66 | 2.92 |

[3]Nominal Specific Gravity = 1.20
[4]Absorber Bottoms = Product
—Nil by analysis From the data set forth above, it is evident that more than 95% of the hydrogen sulfide present in the first and second sour gas streams can be removed using a combination of the static mixer reactors and the countercurrent tray absorber. Further, as indicated by certain of the data, the system can achieve less than 100 parts per million hydrogen sulfide (0.01%) in the sweet gas streams obtained from both the gas-liquid separator 90 and the countercurrent tray absorber 110. Excluding the three sets of data reported on the days 2/27, 3/24 and 4/11, each of which indicated a severe shortage of sodium hydroxide in the partially spent sodium hydroxide solution being separated from the mixed phase effluent by the gas-liquid separator 90, an average inlet concentration of 1.6 percent hydrogen sulfide in the first sour gas stream is reduced to 95 parts per million, a 99.4 percent removal efficiency in the reactor-separator system. Similar efficiencies are indicated in the absorber system on the days 2/29, 3/14, and 4/7. Thus, the data indicate that the combination of the static mixer reactors and the countercurrent tray absorber should be capable of achieving substantially stoichiometric removal of hydrogen sulfide from each of the first and second sour gas streams, while producing a substantially sodium hydroxide-free sodium hydrosulfide solution. Further, data reported on 2/27 indicates the reactor-separator system alone can approach 95 percent stoichiometric removal of hydrogen sulfide.

From the above data it can be seen that the process of the present invention is effective to remove the hydrogen sulfide from sour gas streams, and at the same time produce aqueous solutions of sodium hydrosulfide. Further, the data indicate that substantially stoichiometric removal of the hydrogen sulfide from sour gas streams can be achieved using the combination of the static mixer reactors and the countercurrent tray absorber as illustrated. While the subject invention has been described in terms of certain preferred embodiments, and illustrated by a drawing, such are intended for illustrative purposes only and alternatives or equivalents may readily occur to those skilled in the art without departing from the spirit and scope of the invention as set forth in the appended claims.

What is claimed is:

1. An improved process for removing hydrogen sulfide from sour gas streams to provide a sweet gas stream substantially free of hydrogen sulfide and an aqueous sodium hydrosulfide solution, the process comprising:
   contacting a first sour gas stream containing hydrogen sulfide and carbon dioxide with an aqueous alkali metal hydroxide solution containing a stiochiometric excess of alkali metal hydroxide, based on the amount of hydrogen sulfide present in the first sour gas stream, at conditions preferential to the reaction between the alkali metal hydroxide and the hydrogen sulfide to form a mixed phase effluent;
   separating the mixed phase effluent into a gas phase and a partially spent aqueous alkali metal hydroxide solution containing alkali metal hydrosulfide;
   recovering the gas phase as a carbon dioxide-containing first sweet gas stream substantially free of hydrogen sulfide;
   reactively contacting the partially spent alkali metal hydroxide solution with a substantially carbon dioxide-free, non-process-derived second sour gas stream containing hydrogen sulfide; and
   recovering a second sweet gas stream and a substantially alkali metal hydroxide-free aqueous solution of alkali metal hydrosulfide.

2. The improved process for removing hydrogen sulfide from sour gas streams of claim 1 wherein the alkali metal hydroxide is sodium hydroxide.

3. The improved process for removing hydrogen sulfide from sour gas streams of claim 2 wherein the first sour gas stream and the aqueous sodium hydroxide solution containing a stoichiometric excess of sodium hydroxide are contacted in at least one static mixer reactor.

4. The improved process for removing hydrogen sulfide from sour gas streams of claim 3 wherein the first sour gas stream is introduced into the static mixer reactor at a velocity of from about 60 to about 150 feet per second.

5. The improved process for removing hydrogen sulfide from sour gas streams of claim 2 wherein the second sour gas stream and the partially spent sodium hydroxide solution are contacted in countercurrent flow.

6. The improved process for removing hydrogen sulfide from sour gas streams of claim 2, which further comprises:
   maintaining the partially spent sodium hydroxide solution at a temperature of at least 150° F. during contact of the partially spent sodium hydroxide solution with the second sour gas refinery stream.

7. The improved process for removing hydrogen sulfide from sour gas streams of claim 2 wherein the partially spent sodium hydroxide solution contains a stoichiometric amount of sodium hydroxide, based on the amount of hydrogen sulfide present in the second sour gas stream.

8. The improved process for removing hydrogen sulfide from sour gas streams of claim 2 which further comprises:
   admixing an effective amount of an aqueous sodium hydroxide solution with the partially spent aqueous sodium hydroxide solution to provide a resulting aqueous solution of sodium hydroxide and sodium hydrosulfide containing a stoichiometric amount of sodium hydroxide, based on the amount of hydrogen sulfide present in the second sour gas stream.

9. The improved process for removing hydrogen sulfide from sour gas streams of claim 2 wherein an effective amount of the substantially sodium hydroxide-free aqueous solution of sodium hydrosulfide is mixed with the aqueous sodium hydroxide solution containing a stoichiometric excess of sodium hydroxide prior to contacting the aqueous sodium hydroxide solution with the first sour gas stream.

10. The improved process for removing hydrogen sulfide from sour gas streams of claim 2 wherein the sodium hydroxide is present in the aqueous solution containing a stoichiometric excess of sodium hydroxide in an amount of from about 10 to about 40 weight percent.

11. The improved process for removing hydrogen sulfide from sour gas streams of claim 2 wherein the stoichiometric excess of sodium hydroxide in the aqueous solution is less than about 2 moles of sodium hydroxide per mole of hydrogen sulfide present in the first sour gas stream.

12. The improved process for removing hydrogen sulfide from sour gas streams of claim 2 wherein the aqueous solution containing the stoichiometric excess of sodium hydroxide is atomized prior to and during contact of same with the first sour gas stream.

13. The improved process for removing hydrogen sulfide from sour gas streams of claim 2 which further comprises:
   separating condensed liquids from the first sour gas stream prior to contacting the first sour gas stream with the aqueous sodium hydroxide solution containing a stoichiometric excess of sodium hydroxide.

14. The improved process for removing hydrogen sulfide from sour gas streams of claim 2 wherein the contacting of the aqueous sodium hydroxide solution and the first sour gas stream is carried out in at least one static mixer reactor for a period of time of from about 0.01 to about 1 second and at a temperature of from about 30° F. to about 200° F.

15. The improved process for removing hydrogen sulfide from sour gas streams of claim 14 wherein the first sour gas stream is introduced into the static mixer reactor at a velocity of from about 60 to about 150 feet per second to substantially prevent reaction between the sodium hydroxide in the aqueous sodium hydroxide solution and the carbon dioxide in the first sour gas stream.

16. The improved process for removing hydrogen sulfide from sour gas streams of claim 2 which further comprises:
separating condensed liquids from the second sour gas stream prior to contacting the second sour gas refinery stream with the partially spent aqueous sodium hydroxide solution.

17. The improved process for removing hydrogen sulfide from sour gas streams of claim 2 wherein the second sour gas stream is contacted with the partially spent aqueous sodium hydroxide solution at a temperature of from about 50° F. to about 200° F. and a pressure of from atmospheric pressure to about 150 p.s.i.g. for a period of time effective to allow reaction between the sodium hydroxide and the hydrogen sulfide.

18. The improved process for removing hydrogen sulfide from sour gas streams of claim 17 wherein the period of time for contacting the second sour gas stream and the partially spent aqueous sodium hydroxide solution is for at least about 10 seconds.

* * * * *